United States Patent Office 3,444,520
Patented May 13, 1969

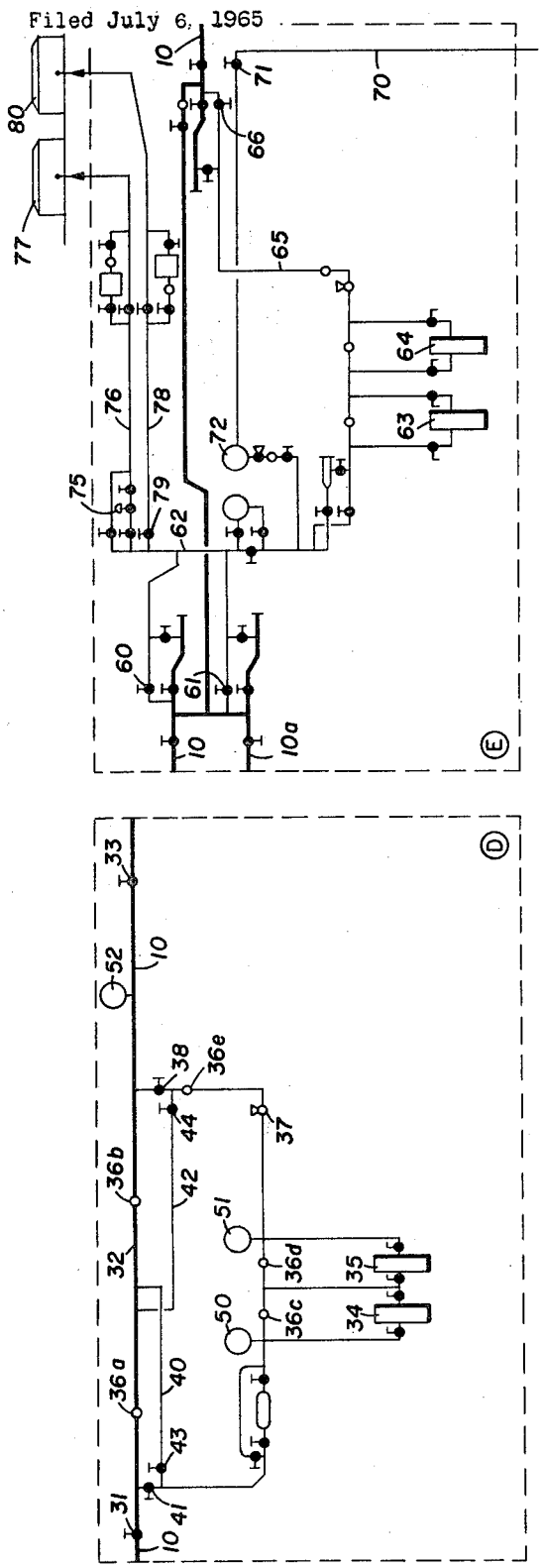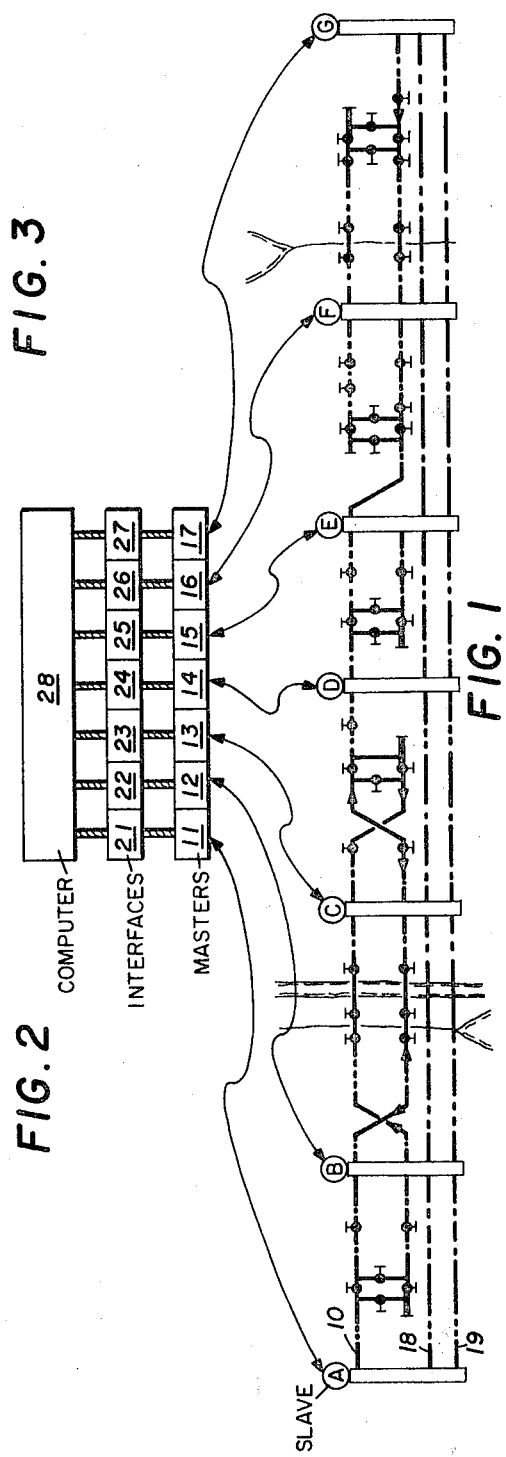

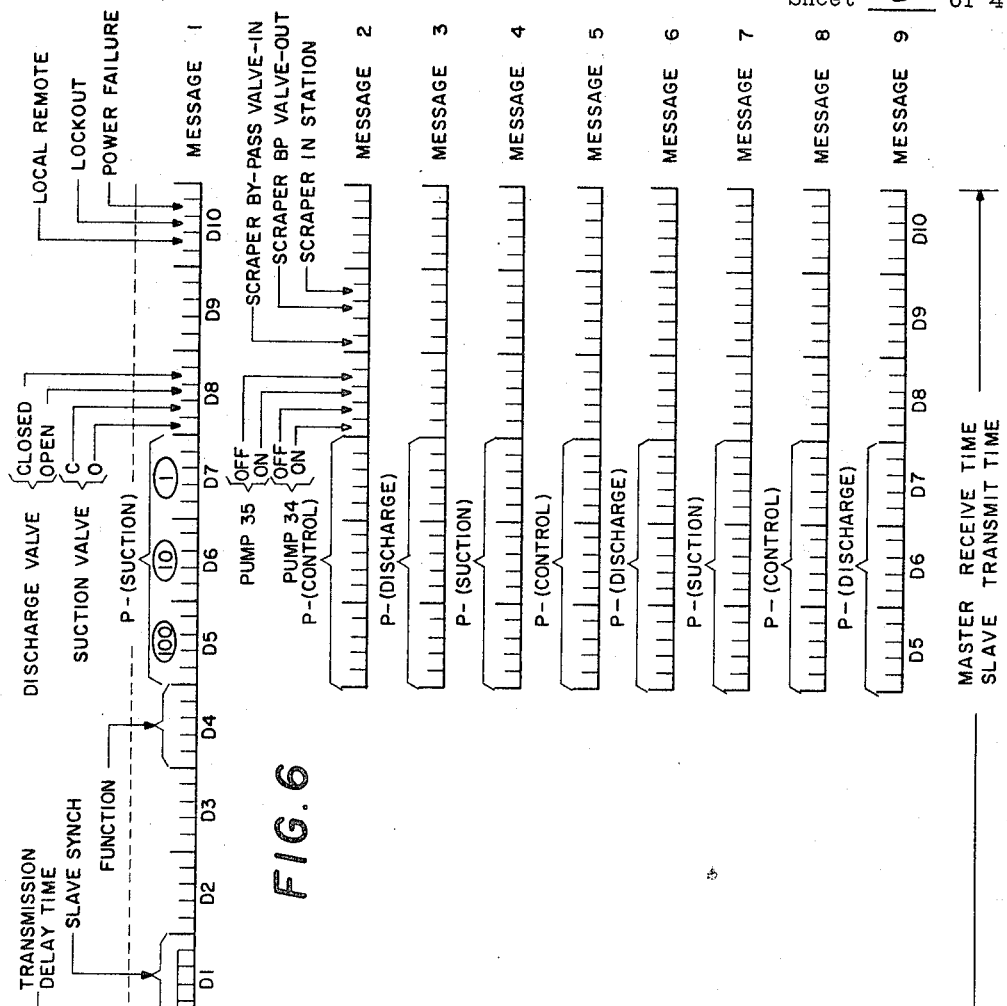
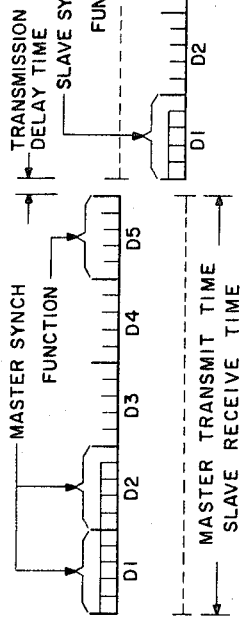
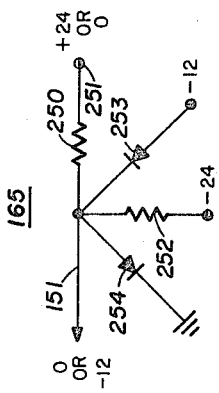

3,444,520
CONTROL INTERFACE FOR COMPUTER
CONTROLLED SUPERVISORY SYSTEM
Lewis D. Messersmith, Irving, George Revere Smith,
Richardson, and James R. Waller, Jr., Dallas, Tex.,
assignors to Mobil Oil Corporation, a corporation of New York
Filed July 6, 1965, Ser. No. 469,561
Int. Cl. H04q 9/02
U.S. Cl. 340—163         13 Claims

ABSTRACT OF THE DISCLOSURE

A plurality of slave stations are linked by communication channels to master stations. A computer is provided at a central station. A plurality of interface units link each master to the computer. Means are provided for the control of transfer of information between all masters and the computer such that the transmission of any control function from computer to a given master will inhibit the transfer of any information from such master to the computer while permitting uninterrupted flow of information from all other masters to the computer.

---

This invention relates to communication between a computer and master stations which control slave stations as in remote control processes such as the control of pumping stations along a pipeline. In a more specific aspect, the invention relates to two-way transmission, between master stations and a digital computer, of data and control information by way of an interface which minimizes construction required while providing all the flexibility that may be necessary.

In pipeline systems, right-of-way problems often dictate the installation of more than one line along a given route. Pumping and control installation costs and operation requirements preferably are optimized to provide all necessary control for the pipelines along a given right-of-way with a minimum of station costs. A central control system for a given pipeline system may include a master station for each slave station with a suitable communications link coupling each master station to its slave station or stations. The control of slave stations, as to coordinate the operation of the entire line, has heretofore been carried out through manual operation of a master station with provision at each slave station to lock out central control whereupon the slave station may be controlled locally by an operator. Data transmitted from slave to master provides information upon which a decision to initiate transmission of control functions from master to slave may reliably be based. Many decisions now made by an operator who manually initiates transmission of a control function to a slave station may be automatically initiated under control of a computer, properly programmed, providing the information is properly supplied to such computer.

In accordance with one embodiment of the invention, a plurality of slave stations are linked by communication channels to master stations. A computer is provided at a central station. A plurality of interface units link each master to the computer. Means are provided for the control of transfer of information between all masters and the computer such that the transmission of any control function from computer to a given master will inhibit the transfer of any information from such master to the computer while permitting uninterrupted flow of information from all other masters to the computer.

More particularly, in accordance with another embodiment of the invention, a pipeline control system is provided in which slave stations each produce digital reply codes representative of a state of conditions at the slave stations. A plurality of master units are associated with a computer by way of interface units, one for each master. Each interface includes means for transmitting to the computer reply codes received by the master units from the slave stations in a serial-by-bit, serial-by-digit mode. Means are provided for multiplexing the reply codes between all the master units and the computer in a parallel-by-bit, serial-by-digit mode. Means in the computer provides for the generation of change command codes. Means are also provided for multiplexing the change command codes from the computer to the master units. Means are provided in each interface to inhibit transfer of selected reply codes between a given master unit and the computer upon production of selected change command codes.

In a more specific aspect, the invention relates to an interface unit which connects a computer output register to a master unit for flow of change command codes and which connects the master both to a computer input register and to a computer interrupt register. The application of a suitable code to the interrupt register initiates transfer of data from the input register to the computer. The interface includes means for interrelating the flow between the computer and the master, such that flow of change command codes will selectively inhibit the flow of reply codes. Further, the interface includes means to provide for the selective inhibition of the flow of telemetered data independently of the flow of change command codes.

For a more complete understanding of the present invention and for further objects and advantages thereof, reference may now be had to the following description taken in conjunction with the accompanying drawings in which:

FIGURE 1 illustrates an application of the present invention to pipeline control;

FIGURE 2 is a detail of equipment at station D for pipeline 10 of FIGURE 1;

FIGURE 3 is a detail of equipment at station E for pipeline 10 of FIGURE 1;

FIGURE 5 illustrates the converter units 165 of FIGURE 4;

FIGURE 6 illustrates a typical message structure employed in carrying out the present invention.

Figure 4:
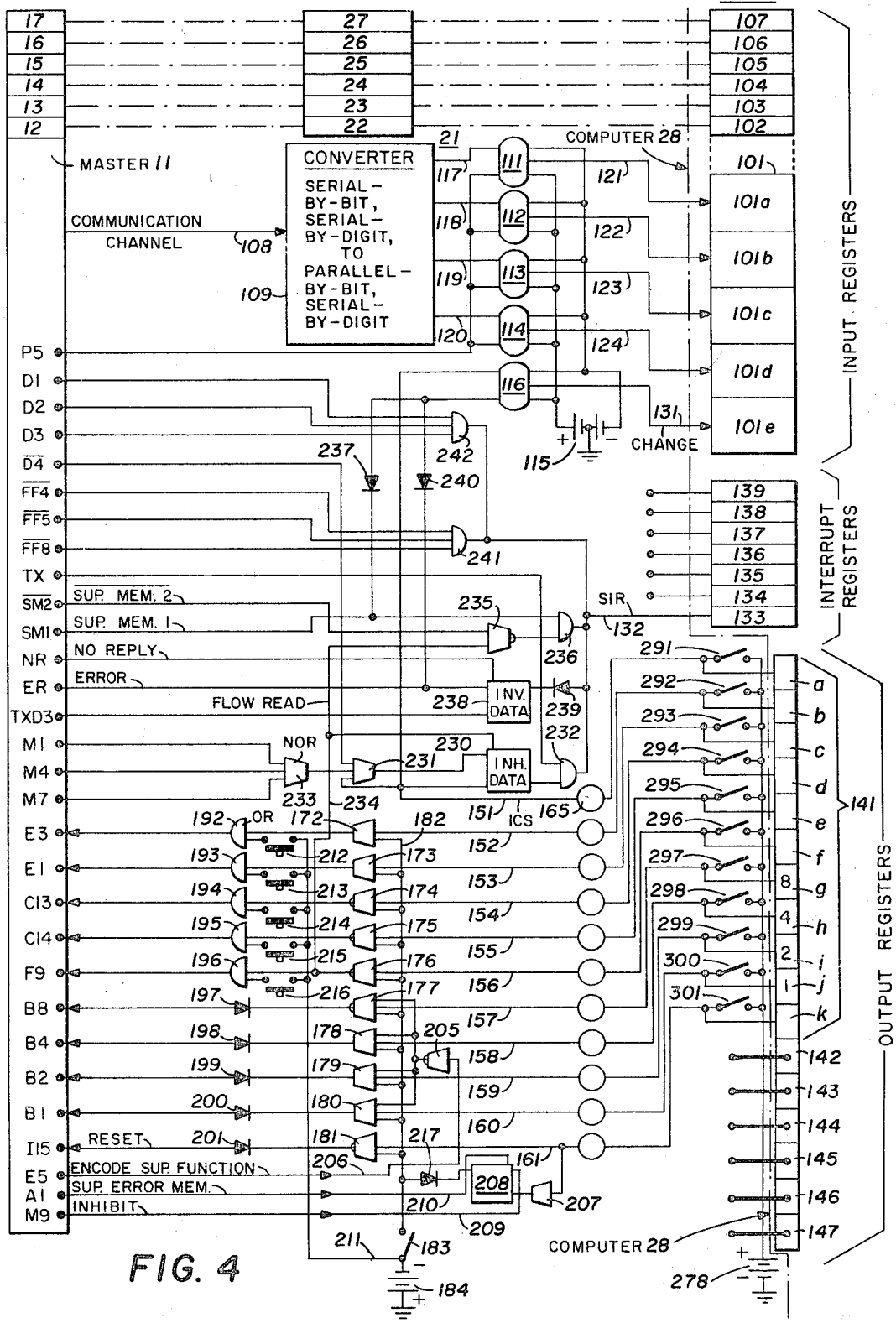
FIGURE 4 is a master-computer linkage schematic diagram including one interface unit 21 which is shown in detail.

Referring now to FIGURE 1, a pipeline 10, such as used for transporting crude oil, extends between stations A and G. In one embodiment of the invention, the pipeline was of the order of 350 miles long. Fluid entering the line at station A, as well as at other stations along the route, is to be controlled in its movement through the pipeline toward station G. Pipelines 18 and 19 parallel pipeline 10 and are also controlled by slave stations A–G. Stations A–G are provided with monitoring and control equipment principally centered around valves and around pumps that the employed to move the fluid. Operations at any station may be monitored and changes in operation may be made over communications channels extending between master stations 11–17 and slave units located at the pumping stations A–G.

The master stations 11–17 are connected by way of interface units 21–27 to a computer 28 which may be suitably programmed to exercise automatic control on the operation of the pipeline. The present invention is directed primarily to an interface means for imposing control on master stations 11–17 by the computer 28 and for feeding to the computer 28, by way of the interface, the necessary pipeline data from the master units 11–17. The interface also includes provisions for coupling to existing manual control, should such be desired. In order to understand the invention, it will be helpful to refer to a portion of the installation at two stations which will be representative of installations at the other stations.

Equipment associated with pipeline 10 at station D has been shown in detail in FIGURE 2. Pipeline 10 enters station D by way of a manual control valve 31. Operating units at station D may be completely bypassed with the flow continuing through the line 32 to the valve 33 at the exit side of station D.

Pumps 34 and 35 may be selectively energized to place either or both of them in use. Station lines are provided with check valves 36a–36e. A pressure control valve 37 is located in the line leading to valve 38 through which the output of the pumps is discharged to pipeline 10. An upstream loop 40 is connected to pipeline 10 between check valves 36a and 36b. Similarly, a downstream loop 42 connected between check valves 36a and 36b leads to station discharge valve 38. By use of loops 40 and 42, a scraper in the main line may be moved through check valve 36a by closing valve 41 and opening valve 43. The scraper may then be moved downstream by closing valve 38 and opening valve 44.

A pressure gauge 50 at the suction side of pump 34 and 35 is provided to monitor the pump suction pressure. A pressure gauge 51 on the output of the pumps is monitored to provide a control pressure measurement. A pressure gauge 52 between station discharge valve 38 and valve 33 in the pipeline 10 serves to monitor the station discharge pressure.

For contralized control of pump stations such as station D, the following data is made available by way of the slave-master links:

(1) Suction pressure;
(2) Control pressure;
(3) Discharge pressure;
(4) Status of pumps 34 and 35 (running or stopped);
(5) Status of valves 41, 43, 44, 38 (open or closed);
(6) Alarm information (power failure or station lockout where the station cannot be placed in operation by remote control);
(7) Station control (local or remote);
(8) Scraper (in or out of the station); and
(9) Telemetering channel failure.

In addition to such information received from the station, it is also desirable to be able to initiate control actions at the station from a remote location. Such control primarily will be employed to open and close valves 38 and 41, and/or start and stop pumps 34 and 35.

Similar data for pipelines 18 and 19 is also provided for station D. It will be noted that two pipelines 10 and 10a enter station E to provide looped operation. The main suction valve 60 leads to a suction line 62 which extends to the input of the pump 63. A pair of pumps 63 and 64 are included in station E and both feed a discharge line 65 which leads to a station discharge valve 66. A suction valve 61 extends from the loop line 10a to the suction line 62. An injection line 70 leads to the station E. This line may extend from a producing field or from a neighboring gathering system. The fluid therein is to be injected into the pipeline 10. Line 70 includes a control valve 71, and an injection pump 72 which forces fluid from line 70 into the suction line 62. A pressure regulator valve 75 is connected at its input to the suction line 62 and is connected to a line 76 which leads to a tank 77. A second line 78, which includes valve 79, leads to a second tank 80. In accordance with one mode of operation of station E, the pressure regulator 75 is set so that fluid flowing to the station by way of pipelines 10 and 10a will be split. Part of the fluid will be pumped through the pump 63 or 64 and out through the main pipeline 10. Part of the flow through the pumps will be supplied by the injection from the line 70. Part of the flow from pipelines 10 and 10a will be bled off through the pressure regulator 75 leading to tank 77. If the flow in line 70 is intermittent, then the tank 77 and tank 80 may serve as surge tanks. If the flow in line 70 is continuous and such flow plus the flow in pipelines 10 and 10a is greater than the capacity of the line downstream of the station E, then the fluid in tank 70 will be disposed of by other means. In one mode of operation, pipeline 18 or pipeline 19 paralleling pipeline 10 receives the flow from tank 77.

Since station E is an injection station, the measurements above noted for station D will be provided and in addition the flow at the station will be measured. Flow data is to be transmitted upon call from station E to the master station 15.

The present invention has, for its principal objective, the linking of the data and control actions above noted to and from a computer 28 to master stations 11–17 via interface units 21–27. Units 21–27 are such that they can control the transfer of information between the masters 11–17 and the computer. In the system partially shown in FIGURE 1, seven stations were located at spaced points along the pipeline. Information was transmitted to each master station for all three of the pipelines.

In general, and for the purpose of the present description, the master-slave linkages may be of the type illustrated and described in U.S. Patent No. 3,045,210 to Langley. In accordance with that system, any slave station may be interrogated by its master station using a digital method of communication. Such digital communication involves transmission and reception of binary coded data based upon an 8–4–2–1-parity, binary-coded-decimal system. The system transmits information in a serial-by-bit, serial-by-digit mode in accordance with 8–4–2–1-parity, binary-coded-decimal code. Means are provided for cyclically scanning the information available at a slave station and for interruption of the cyclic scanning program in order to transmit control functions to the slave station. The linkages between the slave stations and the master stations may be microwave channels or may be wire line channels.

The interface units 21–27, in accordance with the invention, allow transmission to the computer 28 of data which has been converted into parallel-by-bit, serial-by-digit code. Further, in accordance with the present invention, the exchange of information through the interfaces 21–27 is controlled in such a manner as to permit the automatic operation of the entire system.

The interface unit 21, illustrated in FIGURE 4, will permit operation of the master 11 under control of computer 28, either in an interrogate mode or in a control mode.

MASTER TO INPUT REGISTER

In the interrogate mode, a code is fed from the master 11 into the input register 101 of computer 28. Coded data appears on channel 108 in serial-by-bit, serial-by-digit form. It is converted to parallel-by-bit, serial-by-digit form by unit 109. The conversion from a serial-by-bit, serial-by-digit code to a parallel-by-bit, serial-by-digit code is carried out in the converter unit 109 in manner well known in the art. Converter output lines 117–

120 extend to bistable relays 111–114. Voltages from source 115 are applied by way of the relays 111–114 and output lines 121–124 to the respective bit positions 101a–101d in the register 101. Lines 121–124 will be at either +24 or −24 volts, depending upon the state of relays 111–114. A sequence change relay 116 is also connected to the source 115. The relay 116 is coupled by channel 131 to the bit position 101e in register 101 to provide a suitable indication when there has been a change in the interrogation sequence.

Transfer to the computer 28 of selected data on lines 121–124 and 131 will be initiated by the existence of a zero voltage state on an interrupt line 132 leading to a computer interrupt register 133 in the computer 28. Control is such that a digit loaded into the relays 111–114 during one digit interval will be transferred to the register 101 prior to reset of relays 111–114 for the next succeeding digit.

Since the master 11 is but one of a plurality of like master stations that are to be accommodated in the computer 28, the sequencing and control of the transfer of information to the computer and the transfer of information from the computer back to the master station is to be coordinated to avoid loss of telemetered information.

OUTPUT REGISTER TO MASTER

In the control mode, information will be transmitted from the output register 141 to the master 11. Similarly, data may be transmitted from output registers 142–147 to masters 12–17, respectively. During any control operation initiated by a code in the output register 141, the transfer of selected portions of the data stored in relays 111–114 to the input register 101 will not be utilized. This will be accomplished by blocking the application of an interrupt signal (SIR) to the interrupt register 133. Such blocking will prevent the utilization of the data presented by relays 111–114 to the bit storage units 101a–101d of register 101.

In the form illustrated, there are eleven bits in the output register 141. Output lies 151–161 extending from the register 141 each include a voltage converter such as the converter 165. The converters are employed to change the voltage levels from the output register 141 as to be compatible with the voltages required by the master 11. Further, in accordance with the present invention, the conversion is designed to permit the use of NOR logic.

The interface is conditioned to generate interrupt signals (SIR) to input data to the input register 101 of the computer upon generation of a "1" bit by register 141. When a "zero" bit is generated by register 141, the interface is inhibited from generating interrupt signals.

The output register 141 is connected to master 11 by way of the following logic channels. Line 152 extends to a NOR element 172 whose output in turn is applied by way of an OR gate 192 to terminal E3 in the master 11. Line 153 extends by way of NOR element 173 and OR element 193 to terminal E1. Line 154 extends by way of NOR element 174 and OR element 194 to terminal C13. Line 155 extends by way of NOR element 175 and OR element 195 to terminal C14. Line 156 extends by way of NOR element 176 and OR element 196 to terminal F9. The line 157 extends by way of NOR element 177 and diode 197 to the bit 8 input in a bit switch in master 11. Line 158 is connected by way of NOR element 178 and diode 198 to the bit 4 terminal in the master 11. Line 159 extends by way of NOR element 179 and diode 199 to the bit 2 terminal. Line 160 extends by way of NOR element 180 and diode 200 to the bit 1 terminal. Line 161 extends by way of NOR element 181 and diode 201 to the I15 terminal.

A second input on each of the NOR elements 172–181 is supplied by any voltage on bus 182. Closure of switch 183 applies a negative voltage to bus 182 to inhibit transmission of command codes between the computer and a selected master. When switch 183 is closed, the outputs of NOR elements 172–181 are driven to zero, thus effectively disconnecting the output register 141 from the master 11. The NOR elements 177–180 have a third input that is driven by the output of a buffered NOR element 205, the input of which is supplied by the master 11 by way of channel 206 which leads from terminal E5.

The channel 161 leading from the last bit position on register 141 is connected by way of NOR element 207 to the OFF terminal of a latch 208. The ON terminal of latch 208 is supplied by way of channel 209 from terminal M9, which is an inhibit input terminal on master 11. A second ON terminal on latch 208 is supplied by way of channel 210 leading to terminal A1 on master 11. The output of latch 208 is applied by way of diode 217 to bus 182.

The output signals leading to the terminals E3, E1, C13, C14, and F9 are supervisory command signals which may be initiated in computer 28 or may be manually initiated and employed as between master and slave to initiate a desired function to be carried out at a slave station. The manual operation may be performed by way of control switches generically represented by pushbutton switches 212–216. Each of the switches 212–216 is respectively connected to a second input of the OR elements 192–196 and all are connected to line 211 leading to the lower terminal of switch 183.

The voltage states transmitted by way of diodes 197–200 represent the four bits employed in a digit in master 11 to identify the particular device in slave station A that is to be actuated under a given command. Circuitry similar to that above described in the manual generation of supervisory command signals may be added to permit manual generation of the signals required to identify the particular device in a slave station. The signal transmitted by way of diode 201 to terminal I15 is a reset function employed in master 11 to make certain that all of the command circuits are clear for transmission from the computer of command codes.

INHIBIT INTERRUPT CONTROL

When an ICS signal on line 151 is at zero level and is applied to the circuits leading to the interrupt register 133, it initiates the utilization by the computer of data in the input register 101. Line 151 is connected to the OFF terminal of a latch 230 and to one terminal of a NOR element 231. In addition, line 151 is connected to the OPEN terminal of the relay 116. The bottom output terminal of latch 230 is connected through an OR element 232 to line 132. The ON input terminal of latch 230 is connected to the output of the NOR circuit 231. The second input terminal of the NOR unit 231 is driven from a NOR element 233 having three input lines M1, M4, and M7. One input to NOR element 231 is connected to master terminal $\overline{D4}$. The second ON input of latch 230 is connected to a FLOW READ line 234 extending from the output of the NOR element 176. The line 234 also extends to a buffered NOR element 235, the second input terminal of which is connected to master terminal $\overline{SM2}$. The output of NOR element 235 is connected by way of an OR element 236 to the line 132. The second input terminal of the OR element 236 is connected to the master terminal SM1, and, by way of diode 237, to the CLOSE terminal of relay 116. The second terminal of the OR element 232 is connected to the master terminal TX. A second latch 238 is connected at the upper output line by way of diode 239 to the line 132. The OFF input terminal of latch 238 is connected to the master terminal TXD3. The ON terminal of latch 238 is connected to master error terminal ER and, by way of diode 240, to the CLOSE input terminal of relay 116.

An OR gate 241 is connected at its output to the line 132 and at its three input terminals to master terminals $\overline{FF4}$, $\overline{FF5}$, and $\overline{FF8}$, respectively.

An OR element 242 is connected at its output to the line 132 and, at its three input terminals, to the master terminals D1, D2, and D3.

The lower terminal of each of the relays 111–114 is connected to master terminal P5.

FIGURE 5

FIGURE 5 illustrates the construction of the converter units 165. In one embodiment, the computer output register presented bit data at zero or +24 volt levels. It was desired to convert the latter levels to −12 volts and zero, respectively. This is accomplished by use of the circuit illustrated in FIGURE 5. In FIGURE 5, a resistor 250 is connected between the bit terminal 251 and line 151. A second resistor 252 is connected between line 151 and a −24 volt supply terminal. A diode 253 is connected between line 151 and a −12 volt supply terminal. A diode 254 is connected between line 151 and ground. Resistor 250 is of slightly lower resistance than resistance 251. This being the case, when terminal 251 is at zero volts, line 151 is clamped at −12 volts by way of diode 253. When terminal 251 is at +24 volts, the voltage drop across resistor 252 is slightly greater than the voltage drop across resistor 250 so that diode 253 is nonconductive and diode 254 clamps line 151 at ground potential. This conversion renders the computer output compatible with the logic employed by the master and facilitates the use of NOR logic in the interface. While other converters might be employed for this purpose, the simplicity of the circuit and the efficiency with which it operates renders it highly desirable in the present instance. In the embodiment above noted, resistor 250 was 2.2K ohms and resistor 252 was 2.7K ohms.

MESSAGE STRUCTURE

FIGURE 6 illustrates a typical message structure for a control system of the type disclosed in the above Langley patent and is included in order to illustrate application of the present invention. A five-digit message D1–D5 from a master is illustrated, along with a ten-digit message D1–D10 from a slave, to show the relative time sequences. The first two digits D1, D2 are master sync digits and are presented by selectively coding the five bits for each of digits D1 and D2. The bits comprising each digit are 8–4–2–1 and parity in a binary-coded-decimal system. Digits D3 and D4 are respectively station address and mode of operation digits. Digit D5 is employed to designate the desired function to be carried out at the slave. A transmission delay time is present between each slave and master message. A series of messages 1–9 are also included in FIGURE 6, with the message 1 comprised of digits D1–D10 being received by the master from the slave. Digits D1–D4 are respectively slave sync, station address, mode of operation, and function being performed. Message 1 also includes digits D5–D7 representing suction pressure and digits D8–D10 represent the status of certain apparatus at a slave station on pipeline 10. Message 2, received following message 1, includes the control pressure data plus status information. Message 3 includes discharge pressure data plus status information. Messages 4, 5, and 6 are similar in content to messages 1, 2, and 3, except that they relate to pipeline 18. Messages 7, 8, and 9 are similar in content to messages 1, 2, and 3, except that they relate to pipeline 19. The master and slave transmit information serially-by-bit, serially-by-digit.

OPERATION

From the foregoing, it will be shown that the interface 11 basically is comprised of two sections. The first section deals with the problem of providing means for enabling the control computer 28 to scan the intelligence received by the master 11 during its interrogation mode of operation. The second section concerns the problem of generating supervisory commands such as those which will institute flow readings, start and stop of the pumps and open and close of the valves by the control computer.

MASTER TO COMPUTER OPERATION

During the interrogation mode, each master sends and receives a total of nine messages, ten digits per received message, in order to update the various sets of data from the pipelines 10, 18 and 19 (FIGURE 1). Messages 1–3 (FIGURE 6) contain the information from pipeline 10. Messages 4–6 contain the information from pipeline 18, and messages 7–9 contain information from pipeline 19.

By means of the output register 141, the computer 28 will automatically unlatch an inhibiting signal (ICS) on line 151 associated with master 11 when it is desired to update the pipeline information in core storage in the computer 28. Commencing with digit D4 of either message 1, 4 or 7, depending upon the presence of a suitable signal on terminals M1, M4 or M7 of master 11, and depending upon which occurs first, the interface responds to a zero voltage ICS signal to gate an interrupt signal (SIR) during the last five milliseconds of bit 5 of each received digit desired. The interrupt signal is a signal on line 132 switched from −12 volts to zero volt. Interrupt signals on the lines leading to the interrupt registers 133–139 may appear in random time.

The interrupt register is a high priority digital register in the computer 28. Upon receipt of an interrupt signal, the computer is informed that a particular master, such as master 11, which caused the interrupt signal as on line 132, has converted a serial-by-bit representation of a digit into an equivalent parallel-by-bit representation and that the invalid data latch 238 is not set ON. The parallel data representation will exist in the relays 111–114, in the form of +24 volts or −24 volts on lines 121–124 for approximately seventy-five milliseconds. Output lines 121–124 and 131 are connected to the input register bit positions 101a–101e. The operation of the input register 101 is such that an input of +E will result in a "1," whereas an input of −E will result in a "0." At its convenience, but within seventy-five milliseconds, the computer 28 must scan the contents of the input register 101 and route the contents to the proper core storage location.

Thus, the computer makes use of the unique position assigned to each master in the interrupt registers 133–139, and further makes use of the fact that D4 time of each received message contains the message number. The computer will keep track of the numbers of the messages received and scanned. After the receipt of nine consecutive and complete messages without any interruption in message sequence from a particular master station, the computer's output register 141 will, if desired, resupply the inhibiting signal as on line 151. This signal prohibits the generation of an interrupt signal and will remain in this state until it is time again to update the data stored in the computer. Updating of core storage each time the master receives a slave's reply can be accomplished by allowing the inhibiting signal to remain off. As there are seven independent masters 11–17, the foregoing actions will be increased by a factor of seven, hence allowing an average of approximately ten milliseconds to scan and store the contents of any one of the registers 133–139.

The interface in its operation is responsive to the following signals which are available from the master or are produced in an interface or in the computer 28.

| Signal | Origin | Characteristics |
| --- | --- | --- |
| ICS | Interface (line 151) | Held at −12 VDC between the times at which the pipeline information stored in computer 28 is updated. |
| M1 | Master | Held at −E during message 1 if in an interrogation mode. |
| M4 | do | Held at −E during message 4 if in an interrogation mode. |

| Signal | Origin | Characteristics |
| --- | --- | --- |
| M7 | do | Held at −E during message 7 if in an interrogation mode. |
| $\overline{D4}$ | Master Timer | Held at zero during D4 time. |
| TX | Master Transceiver Register. | Held at zero when master station is in receive mode. |
| D1 | do | Held at −12 VDC during D1 time. |
| D2 | Error Detector | Held at −12 VDC during D2 time when master is in receive mode. |
| D3 | do | Held at −12 VDC during D3 time when master is in receive mode. |
| $\overline{FF4}$ | Master Timer | Held at zero during the 2d and 4th quarter of each bit time. |
| $\overline{FF5}$ | do | Held at zero during the last half of each bit time. |
| $\overline{FF8}$ | do | Held at zero during Bit 5 time of each digit. |
| FLOW READ | Interface (line 234) | Goes to −12 VDC during a computer initiated supervisory command involving a FLOW READ. |
| SM1 | Master | Normally held at −12 VDC from the start of a supervisory command until B4 time of D1 time during the transmission of the second command message. |
| $\overline{SM2}$ | do | Held at zero volts during essentially all of messages 1 and 2 of a supervisory command. |
| NR | Master Error Detector. | Goes to −12 VDC in the event a reply has not been received by the master within a set period of time. |
| ER | do | Goes to −12 VDC during B5's sample time in a master's receive cycle in event of an error condition. |
| TXD3 | do | Held at −12 VDC during D3 time of a master's transmission. |
| SIR | Interface (line 132) | Held at zero during last five milliseconds of a B5 time when information is to be read from input register 101. |
| P5 | Master Error Detector. | Held at −12 VDC during the last half of B4 time. |

In the event that a master 11 is receiving information from a slave station when the computer 28 desires to update its core storage of line information (ICS set to $\phi$ volts by the output register 141 and converter 165), M1, M4, and M7 together with $\overline{D4}$ insure that the interrupt signal SIR is first generated during D4 time of the beginning message associated with either of the three pipelines 10, 18, or 19. Should the master station be transmitting, or if the slave transmission is *beyond* D4 time of M7 when an ICS occurs, $\overline{\text{Inhibit Data}}$ 230 will be set to $\phi$ volts either during D4 time of M1, M4, or M7 during the master's transmission or D4 time of M7 when the master enters the receive mode.

Should $\overline{\text{Inhibit Data}}$ 230 be set to $\phi$ volts during a master's transmission, the signal TX will block generation of the interrupt signal SIR until the master enters the next receive mode.

Signals D1, D2, and D3 block generation of an interrupt (SIR) during these digits as they do not contain required information.

The computer 28 should not be interrupted by the signal SIR to scan input register 101 before the validity of the digit on channel 108 has been verified by master 11. If the digit is invalid, the signal ER will be set to −12 VDC during the sample time (first 0.625 millisecond in second half of a Bit time) of Bit 5. In this event, blocking of the interrupt signal SIR by the invalid data latch 238 cannot occur before this time. In order to allow time for the latch 238 to be set ON if required, the signal $\overline{FF4} + \overline{FF5} + \overline{FF8}$ is used to delay the generation of the interrupt signal SIR until during the last five milliseconds of Bit 5 time.

At the initiation of a supervisory command involving either a start-open or stop-close function, the one of the START-OPEN or STOP-CLOSE switches 212–216 will be closed to set −12 volts from line 211 into the selected OR gate. The signal remains at −12 volts through both the transmission and reception of the two messages associated with a supervisory command and until Bit 2 time in D1 of the master's first transmission in the interrogation mode. The $\overline{SM2}$ signal is used to block generation of the interrupt signal SIR while the master is receiving the slave's two transmissions as they do not contain required information.

The message structure associated with a flow read supervisory command differs from the above in that the slave's second transmission contains the flow information for the point selected. With the initiation of a flow read supervisory command by the control-computer, ICS will be set to $\phi$ volts and FLOW READ is set to −12 volts, hence setting $\overline{\text{Inhibit Data}}$ 230 to $\phi$ volts. The output of NOR element 235 will be at zero volts during both FR messages. SM1 will block interrupt signals SIR during message 1, but will allow SIR to be generated during digits D4–D10 of the second reply from the slave.

Each of seven interrupt signals from the seven interfaces 21–27 are connected to a unique position in interrupt registers 133–139 associated in computer 28. Upon satisfactory generation of an interrupt signal SIR, the associated voltage applied to the interrupt registers 133–139 changes from −12 volts to $\phi$ volts and remains at $\phi$ volts for five milliseconds. This positive going voltage will cause a slight interruption in the computer's proceedings and informs it of the particular master station having a digit ready for transfer to core storage via the associated interface. After initial receipt of a SIR interrupt, the control-computer has approximately seventy-five milliseconds to scan and store the digit represented in the portion of the input register associated with the interface from which the SIR signal originated. Simultaneous SIR interrupts by the various masters will be handled correctly as an interrupt indicator is not reset until acknowledged by the control-computer.

The information is loaded into the input register by means of the set of relays 111–114 in a parallel-by-bit, serial-by-digit sequence from converter 109.

An interruption in the normal message sequence can be caused by either the generation of an ER signal or a SM1 signal. Interruptions in the message sequence will necessitate re-synchronization of the control-computer's scan program with the master. Rather than detect such an interruption solely by stored programing, a "change" indicator will be interrogated by the scan program.

The signal CHANGE (131) is the fifth and last signal terminated in the input register 101 at bit position 101e with the interface 21 from which the SIR signal originated. When a change in message sequence occurs, the signal CHANGE will be set to +E volts, resulting in a "1" being set in the associated bit position in the input register. Detection by the program of a "1" in this bit position indicates that the message sequence has been changed since the last scan. The scan program will then be re-synchronized and the CHANGE indicator reset by the temporary generation of an ICS signal at −12 volts.

The above has described in some detail the operation of the master to computer portion of the proposed interface. Significant features of the interface are:

(1) A scan by the computer merely requires a sampling of the information being received by the master. In no way are the operations of the pipeline system altered when updating of core storage is desired.

(2) Interfacing is accomplished utilizing in addition to a start signal from the computer only those signals which are available at the master stations.

(3) The number of signal circuits in and out of the control-computer is at a minimum with only a total of seven circuits per master being required.

COMPUTER TO MASTER OPERATION

The following events occur in the generation of a command by a master:

(1) During transmission of first message:

(A) The synchronization pulse during the first nine bit times of D1 and D2 is automatically generated, as in the case of normal interrogation.

(B) A station address is automatically generated in D3 time, as in the case of normal interrogation.

(C) A multiplier, representative of the mode of operation, automatically is generated in D4 time.

(D) A function code is generated as a result of depression of one of a particular unit's select pushbuttons (such as 212–216). The signal initiates logic to enable gating out at D5 time the function code associated with the unit selected.

The slave's reply is checked by the master for parity and consistency with the original message. If correct, the master then begins transmission of the last of the two messages required to execute a supervisory command.

(2) During transmission of the second message:

(A) The sync signal, station address and multiplier are generated as in the first message.

(B) In the event a supervisory command requires FLOW READ, the function code will be generated in the same manner as in the first message.

(C) In the event of a supervisory command involving either START-OPEN or STOP-CLOSE, the function code is either a decimal 3 or a decimal 12, respectively.

After reception at the slave, parity checking of the master's second message then causes execution of the desired operation. The master resets the console pushbuttons and resumes a normal interrogation mode of operation.

Computer-initiated supervisory commands can be accomplished by the computer to master portion of the interface described herein. The pushbuttons 212–216 on the console keyboards supply basic signals which are gated by logic furnished by the master. It is only necessary for computer 28 to furnish via its output register 141 signals equivalent to those previously discussed. The signal required for generation of the appropriate action function code during the second message, in the case of a START-OPEN or STOP-CLOSE, is gated from the interface to the associated master. The signal required for generation of the appropriate select function code during the first message (and second message in the case of FLOW READ) is gated directly from the interface to the master.

The following pertains to the computer to master portion of the interface 21 associated with master 11 and to other interface units 22–27.

| Signal | Origin | Characteristics |
|---|---|---|
| M9 | Master | Held at −12 VDC during B2 of D1 time in the master's first interrogation transmission following a supervisory command, if the SUP.ERROR MEM. latch was not set on. |
| SUP. ERROR MEM. | do | Goes to −12 VDC during master's reception time if an error is detected during period that SUP. MEM 2 is at −12 VDC) If set to −12 VDC, it remains at that leve_ until reset to φ VDC by the signal RESET. SUP. MEM 2 is normally at −12 VDC from B2 of D2 time in master's first of two supervisory command transmissions until B3 of D1 time in master's first interrogation transmission following a supervisory command. |
| ENC. SUP. FUNCTION. | do | Held at −12 VDC only during D5 time (function digit) of] master's first of two supervisory command transmissions unless a Flow Read command is to be sent, in which case E-5 is also held at−12 VDC during D5 time of the master's second supervisory command transmission. |

The duration of signals considered below is from the time of initiation until reset to φ VDC by generation of a M9 signal.

| Signal | Termination | Characteristics |
|---|---|---|
| E1 | Master | Goes to −12 VDC with the depression of either START-OPEN pushbutton associated with pipelines 10 or 18 OR with equivalent action by the computer 28. |
| E3 | do | Goes to −12 VDC with the depression of the START-OPEN pushbutton associated with the pipeline 19 OR with depression of a pushbutton to produce a RESET condition OR with equivalent action by the computer 28. |
| C14 | do | Goes to −12 VDC with the depression of either STOP-CLOSE pushbutton associated with pipelines 10 or 18 OR with equivalent action by the computer 28. |
| C13 | do | Goes to −12 VDC with the depression of the STOP-CLOSE pushbutton associated with the pipeline 19 OR with equivalent action by the computer 28. |
| F9 | do | Goes to −12 VDC with the depression of the READ FLOW pushbutton OR with equivalent action by the computer 28. |
| B8-4-2-1 | do | Goes to −12 VDC in combinations or individually as required to encode a FUNCTION code being supplied via either a push-button or equivalent action by the computer 28. |
| I15 | do | Goes to −12 VDC when the computer 28 initiates a reset of the master command module. |
| ICS | Interface | Held at −12 VDC between the times at which the pipeline information stored in the computer is updated. |

Each of the output registers 141–147 has the capability to simultaneously latch up to 11 contacts based on the contents of an associated 11 bit register. A computer data bit of "1" corresponds to a close (conducting) while a "φ" bit corresponds to an open (non-conducting). Where the output registers can handle only positive signals and the control equipment utilizes negative control signals, it is necessary to provide circuitry which will transform the positive signals into the negative signal range required by the control equipment. In addition, in order to utilize NOR logic a signal inversion is required. The converter 165 of FIGURE 5 accomplishes the required signal conversion and signal inversion, the result being that a "1" data bit in the output register 141 results in a signal level of φ VDC supplied to the following logic elements while "φ" data bit in the output register results in a −12 VDC signal.

When the eleven positions in the output register 141 are set to zeroes, no supervisory commands will be generated by the control-computer and no updating of stored pipeline information will be performed. A zero voltage signal is transferred onto line 151 by the presence in position 141a of the output register 141 of a "1" bit and its conversion by converter 165 when it is desired to commence updating the pipeline information held in core storage. Replacement in position 141a of the "1" bit with a "φ" bit would cause updating to cease. Similarly, combinations for four "φ" bits and a "1" bit would be used in positions 141b–141f to represent a depression of any of the previously discussed "action" push-buttons. Positions 141g–141j would be used for development of any unit's "select" Function Code (decimal 1–14). Generation of a signal equivalent to RESET SUPV MEM and removal of an inhibiting signal from line 182 would depend upon the status of the data bits in position 141k of the output register 141.

Generation of a supervisory command by the control-computer would be performed by two data transfers to the output register 141, the first being a transfer of a "1" bit into position 141k along with nine "φ" bits into positions 141b–141j. As a result, the Master Command Module would be set off (if on) and the signal on line 182 in the interface would be set to φ. Immediately after execution of the first transfer, the second transfer would be performed. This would involve a simultaneous transfer of a "φ" bit into position 141k; into positions 141g–141j, the required combination of "1" and "0" bits in binary-coded-decimal form necessary to represent the Function Code (decimal 1-14) of the unit to be selected; into one of the positions 141b-141f, a "1" bit for effecting the desired action at the slave. Since the signal on line 182 was set to $\phi$VDC as a result of the first transfer, a —12 VDC signal will be sent to either E3, E1, C13, C14 or F9 in the Master Command Module depending upon which of the 141b-141f positions contained a "1" bit. The presence of a —12 VDC signal on one of the above terminations will cause actual initiation of a supervisory command, with the resulting actions up to D5 time in the first message being exactly as if caused by a keyboard push-button. At D5 time in the first message, the Function Code contained in positions 141g-141j would be properly gated to the binary-coded-decimal (BCD) register by the signal at terminal E5 going to $\phi$VDC. Progression through D4 time of the master's second message would proceed as previously outlined. At D5 time in the second message the Function Code will either be supplied again from position 141f of output register 141 in the event of a FLOW action or automatically generated in the Master Command Module.

Upon satisfactory generation of a command the signal M9, which is normally used to reset the push-buttons, will automatically set to —12 VDC the signal on line 182 hence inhibiting further output via the positions 141b-141k of output register 141. In the event a command was not accomplished due to channel trouble or some other failure, the signal SUPV ERROR MEM will set the level on line 182 to —12 VDC. The computer would detect failure of the Command when it next checks the various status indications.

The above has described in a general manner the computer to master portion of the proposed interface. Use of individual diodes in place of OR elements and the extent of signal isolation to be employed may be varied from the example described, depending upon the needs of a given installation.

The functions above described to the output register 141 may be carried out manually. In FIGURE 4 it will be noted that each of the lines 151-161 may be selectively connected to a voltage source 278 by way of switches 291-301, respectively. Switches 291-301 may be manually closed to simulate operation of the output register 141 of computer 28, or to exercise manual control over selected operations of the master 11.

Significant features of the interface are:

(1) Both the number of signals and logic components are kept to a minimum by supplying the Function Code in binary-coded decimal form directly from the positions 141g-141j of output register 141 to the terminals B8-B1 in the master.

(2) The computer to master portion of the interface may be entirely of solid state components.

(3) An increase in the number of supervisory commands can readily be accommodated by the interface.

(4) Generation of supervisory commands by the computer 28 is entirely independent of the console installations which may exist in a given control system for control thereof which is solely manual. Similarly, scanning of telemetered data is independent of a manual control console.

COMPUTER SCAN INTERRUPT

Figure 7:
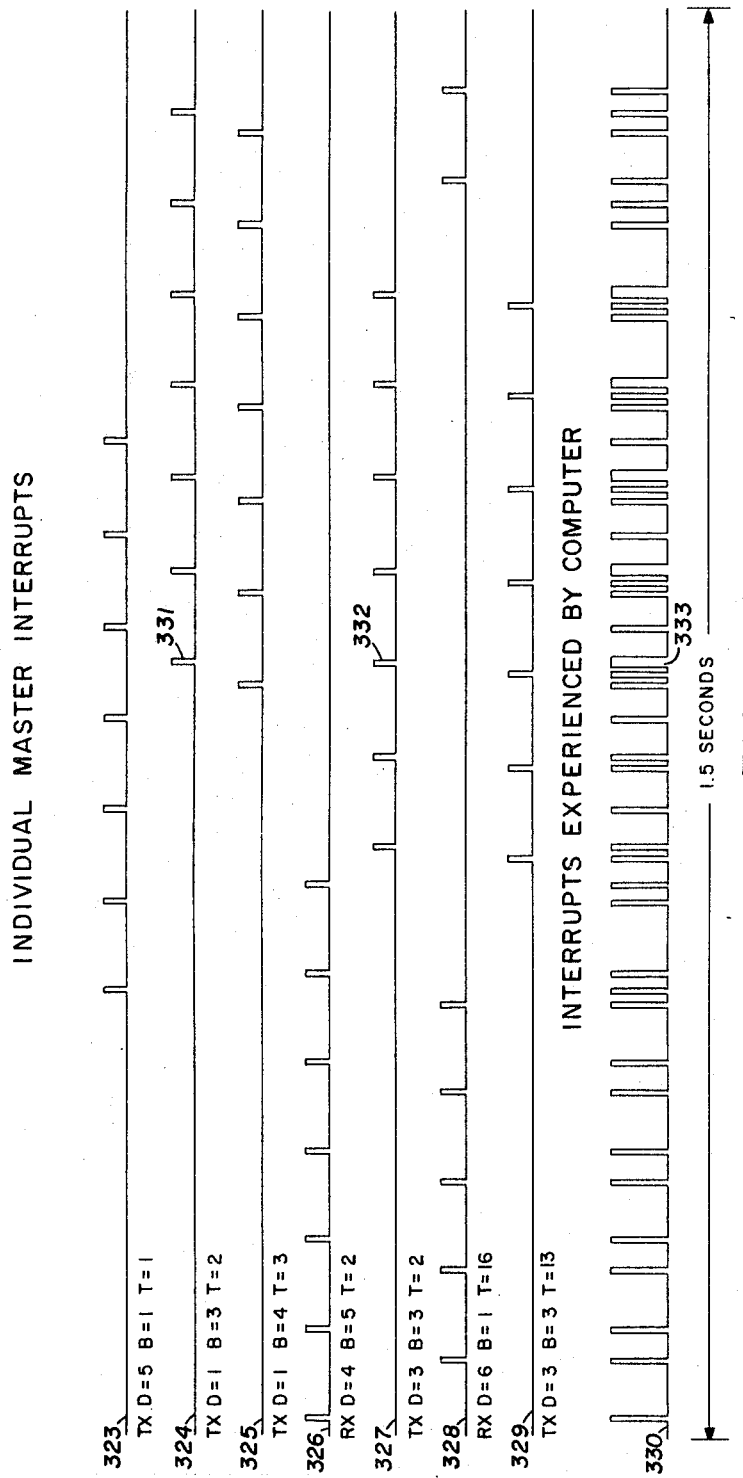
FIGURE 7 illustrates the accommodation by the computer of randomly occurring interrupts in the interface units 21–27.

FIGURE 7 illustrates the application to computer 28 of scan interrupt register (SIR) signals where the seven master stations operate independently of each other. Because the masters are independent, the presentation of SIR signals to the computer by the various masters occurs in a manner which appears to be random. The function 323 illustrates five millisecond SIR signals applied to registers 133 by way of line 132. Functions 324-329 illustrate similar SIR pulses applied to interrupt registers 134-139, respectively. The SIR signals occur during the last half of the last bit in each of digits D4-D10 of the message received by the master during a normal interrogation mode of operation. The mode of operation and the zero reference time on each of the functions are as follows:

Function 323: Master 11 in a transmit mode, with time $=0$ at 1 millisecond in bit 1 of digit 5 ($D=5, B=1, T=1$);

Function 324: Master 12 in a transmit mode with time$=0$ at $D=1, B=3, T=2;$

Function 325: Master 13 in a transmit mode with time$=0$ at $D=1, B=4, T=3;$

Function 326: Master 14 in a receive mode with time$=0$ at $D=4, B=5, T=2;$

Function 327: Master 15 in a transmit mode with time$=0$ at $D=3, B=3, T=2;$

Function 328: Master 16 in a receive mode with time$=0$ at $D=6, B=1, T=16;$ and Function 329: Master 17 in a transmit mode with time$=0$ at $D=3, B=3, T=13$.

Function 330 illustrates the sum of all of the interruptions occurring in functions 323-329 from masters 11-17 during a one and one-half second message interval. The time thus required by the computer to scan input registers 101-107 is represented by the pulses in function 330. It will be noted that some of the interrupt signals plotted in functions 324 and 327 occur in time-coincidence. More particularly, SIR pulse 331 and SIR pulse 332 occur at the same time. In this case, the computer will interrogate input register 102 during the first half of pulse 333 and will then interrogate register 105 during the second half of pulse 333 which will be within the period of the next digit. If more than two SIR pulses occur at the same time, the interrogation of the successive registers will be continued in an ordered manner and may occupy time extending as far as the beginning of the second half of B4 time in the next digit. It will be noted that there are seven SIR signals in each of functions 323-329, each set of seven SIR signals representing the scan of an input register during a five millisecond interval located in the last one-half of the parity bit in each of digits D4-D10 in each message received by the master during a normal interrogation.

With interface units coupling masters to the computer in the manner indicated in FIGURE 4 and with control signals available from the master and computer as above described, the computer will be programmed to control flow of data presented at the input registers and for producing, in response to such data or in response to any other predetermined program requirement, control functions to be represented by the states of the various bits in the output registers 141-147. The interface units 21-27 permit the computed to acquire data that is presented randomly by the masters. Representative of computer systems available and suitable for use as computer 28 of FIGURE 4 is the H-20 Control System manufactured and sold by Minneapolis-Honeywell of Minneapolis, Minn., and the IBM-1800 Control System manufactured and sold by IBM Corporation of New York, N.Y.

It will be recognized that the foregoing description has been based upon the use of NOR logic and the presentation to the input registers 101-107 of voltages. The NOR logic disclosed in FIGURE 4 could be replaced with AND logic, with corresponding modifications in the character of the input signals. The voltage presentation provided by relays 111-114 and 116 could also be by way of the OPEN or CLOSED status of relays. It will be noted that there are sixteen inputs leading from the master 11 to the SIR bus 132 and one input, namely line 151, leading from output register 141 to the SIR bus 132. While the ICS signal line 151 would in all cases be employed, some of the master signals leading to the SIR bus might be modified or eliminated depending upon the particular operations required of the master. For example, if a slave station were employed in connection with a single pipeline then the necessary information to be supplied from the master to the slave could be included in three messages in which case the M4 and M7 signals to the interface would be eliminated.

What is claimed is:

1. In a control system including a plurality of operating stations, the combination which comprises:
   (a) slave units, one at each of said stations,
   (b) master stations linked to said slave units,
   (c) a digital computer having an input register, an output register, and a priority interrupt register through which the computer is actuated to receive data from said input register,
   (d) means to control said interrupt register from said computer and from all of said master stations, and
   (e) means to prevent actuation of said interrupt register from any one master station during transfer of selected information from said output register to said one master station.

2. In a pipeline system where a plurality of pipeline operating stations are spaced along said pipeline and have means to measure flow, the combination which comprises:
   (a) slave units, one at each of said stations, linked to master stations,
   (b) a digital computer having an input register, an output register, and a priority interrupt register through which the computer is actuated to receive data from said input register,
   (c) means to control said interrupt register from said computer and from all of said master stations, and
   (d) means to prevent actuation of said interrupt register from any one master station during transfer of all information from said output register to said one master station except data corresponding with measurement of said flow.

3. In a pipeline system where a plurality of pipeline operating stations are spaced along said pipeline with slave units, one at each of said stations, linked to master stations, the combination which comprises:
   (a) a digital computer having an input register, an output register, and a priority interrupt register through which the computer is actuated to receive data from said input register,
   (b) means to control said interrupt register from said computer and from all of said master stations, and
   (c) means to prevent actuation of said interrupt register from any one master station during transfer of selected information from said output register to said one master station.

4. In a pipeline system where a plurality of pipeline operating stations are spaced along said pipeline, the combination which comprises:
   (a) slave units, one at each of said stations, linked to a plurality of master stations,
   (b) a digital computer having an input register, an output register, and a priority interrupt register which directs the computer to receive data from said input register,
   (c) an interface unit between each master station and said computer for control of said interrupt register from said computer and from all of said master stations, and
   (d) means for generating in each said interface unit an output condition for application to said interrupt register to prevent flow of data from any one master station to said computer during transfer of selected information from said output register to said one master station.

5. In a system wherein master stations and slave stations are linked by digital telemetry means operating in serial-by-bit, serial-by-digit mode for control of operative means at said slave stations and for monitoring at said master stations conditions existing at said slave stations, the combination which comprises:
   (a) ring a digital computer having an input register, an output register, and a priority interrupt register, and
   (b) interface units connecting each said master station to each said input register, each said interface including
      (i) bistable circuits in which each digit received by a given master is stored in parallel-by-bit form and whose outputs are connected to ordered bit positions in said input register,
      (ii) a plurality of code and function channels leading from said output register to said given master for applying change control commands to said given master,
      (iii) a plurality of logic channels leading from said given master to said interrupt register for applying to said interrupt register an interrupt signal only upon coincidence between selected states of conditions of said master, and
      (iv) means to selectively inhibit said interrupt signal.

6. The combination set forth in claim 5 in which means in said logic channels produce during interrogation of a given slave station an interrupt signal for application to said interrupt register only during the last portion of the last bit of a digit stored in said bistable circuits which represents a condition at said given slave station linked to said given master.

7. The combination set forth in claim 5 in which said bistable circuits at least equal the number of bits in each digit, and in which means are provided for resetting said relays during the time of the next-to-last bit in the digit following a given digit stored in said bistable circuits, and in which means are provided for generating interrupt signals only during the time of the last bit in each said digit which represents a condition at the slave station linked to said given master.

8. The combination set forth in claim 5 which includes means to employ communication in an 8–4–2–1-parity mode and in which said logic channels include means for generating during interrogation of a given slave station an interrupt pulse during a selected fraction of each parity bit of each digit representing a condition at said given slave station and for resetting said bistable circuits during the time of the "1" bit of the digit following the digit stored in said bistable circuits.

9. The combination set forth in claim 6 in which a channel extends between said output register and said logic channels to inhibit application of said interrupt signal to said interrupt register when said given master is in a control mode.

10. The combination set forth in claim 5 in which a link between said output register and said logic channels holds said logic channels at a level to inhibit production of any interrupt signal between the times when slave station information stored in said computer is being updated.

11. In a pipeline system where a plurality of pipeline operating stations are spaced along said pipeline with slave units, one at each of said stations, linked to a plurality of master stations for operation under control of a digital computer having an input register, an output register, and a priority interrupt register through which the computer is actuated to receive data from said input register, the combination which comprises:
   (a) an interface unit for a given master station, including
      (i) a communication link for leading from said given master station and having a plurality of bistable circuits for storing digital condition information from a slave station in parallel-by-bit, serial-by-digit form and having connections for applying said condition information stored therein to said input register,
      (ii) control linkages for leading from said output register to said given master station for applying command information to said given master station,
      (iii) an inhibit linkage for leading from said given master station to said interrupt register and including logic circuits which require coincidence between a plurality of conditions in said given master in order to enable the application of an interrupt pulse to said interrupt register, and (iv) a linkage for connecting said output register to said inhibit linkage to selectively prevent production of interrupt signals upon actuation of said control linkages to apply command information to said given master station.

12. An interface unit for coupling a digital computer to a supervisory control system including at least one master station and slave station, comprising the following:

(a) a receive section, including
- (i) storage means for storing in parallel-by-bit form for input to the computer, selected digits received by the master station
- (ii) logic circuitry for generating an interrupt signal upon the occurrence of selected logic conditons from the master station to cause the computer to scan the storage means,
- (iii) means for selectively inhibiting the generation of the interrupt signal, and (b) a command section, including
- (i) logic circuitry responsive to the output of the computer for placing the master station in the command mode, thereby initiating automatic generation of a message from the master station to the slave station,
- (ii) means for gating a commond function generated by the computer into a selected portion of the message generated by the master station, whereby the supervisory control system may, if desired, function independently of the computer.

13. The interface unit of claim 12 which further includes means for manually disabling the operation of the command section so that the computer does not affect the operation of the supervisory control system.

References Cited

UNITED STATES PATENTS

| | | | |
|---|---|---|---|
| 3,146,456 | 8/1964 | Silliman et al. | 340—163 |
| 3,245,038 | 4/1966 | Stafford et al. | 340—147 |
| 3,252,138 | 5/1966 | Young | 340—151 X |

JOHN W. CALDWELL, *Primary Examiner.*

H. I. PITTS, *Assistant Examiner.*

U.S. Cl. X.R.

340—151

UNITED STATES PATENT OFFICE
CERTIFICATE OF CORRECTION

Patent No. 3,444,520                                                          May 13, 1969

Lewis D. Messersmith et al.

It is certified that error appears in the above identified patent and that said Letters Patent are hereby corrected as shown below:

Column 3, line 1, "the", first occurrence, should read -- are --; line 14, "provisions" should read -- provision --; line 38, "pump" should read -- pumps --; line 45, "contralized" should read -- centralized --. Column 5, line 40, "lies" should read -- lines --. Column 9, line 53, "M'" should read -- M1 --. Column 11, in the table, third column, line 8 thereof, "-12 VDC)" should read -- -12 VDC. --; same table, third column, line 9 thereof, "leve-" should read -- level --. Column 14, line 49, "computed" should read -- computer --. Column 15, line 73, cancel "ring". Column 17, line 18, "computer," should read -- computer --; line 19, after "station" insert a comma.

Signed and sealed this 3rd day of March 1970.

(SEAL)
Attest:

EDWARD M. FLETCHER, JR.                                  WILLIAM E. SCHUYLER, JR.
Attesting Officer                                                 Commissioner of Patents